United States Patent [19]

Watanabe

[11] Patent Number: 5,398,502
[45] Date of Patent: Mar. 21, 1995

[54] SYSTEM FOR CONTROLLING A VALVE MECHANISM FOR AN INTERNAL COMBUSTION ENGINE

[75] Inventor: Kenzo Watanabe, Fuchu, Japan

[73] Assignee: Fuji Jukogyo Kabushiki Kaisha, Tokyo, Japan

[21] Appl. No.: 63,021

[22] Filed: May 17, 1993

[30] Foreign Application Priority Data

May 27, 1992 [JP] Japan ............................ 4-042672 U
May 27, 1992 [JP] Japan ............................ 4-161977

[51] Int. Cl.⁶ .............................................. F01N 3/00
[52] U.S. Cl. ...................................... 60/284; 60/286; 123/90.15
[58] Field of Search .................... 60/284, 286, 294; 123/90.15, 90.16, 90.17

[56] References Cited

U.S. PATENT DOCUMENTS

| | | | |
|---|---|---|---|
| 3,507,261 | 4/1970 | Myers et al. | 60/278 |
| 5,134,850 | 8/1992 | Saito et al. | 123/90.16 |
| 5,222,465 | 6/1993 | Sakamoto et al. | 123/90.15 |
| 5,233,831 | 8/1993 | Hitomi et al. | 60/284 |
| 5,280,770 | 1/1994 | Satou et al. | 123/90.15 |
| 5,293,741 | 3/1994 | Kashiyama et al. | 60/284 |

FOREIGN PATENT DOCUMENTS 60-27711 2/1985 Japan.

*Primary Examiner*—Douglas Hart
*Assistant Examiner*—Weilun Lo
*Attorney, Agent, or Firm*—Martin A. Farber

[57] ABSTRACT

A system for controlling a valve mechanism for an internal combustion engine has a valve timing device for changing the valve timing of an exhaust valve of the engine, and a changing device for changing the opening duration of an intake valve of the engine. A detector is provided for detecting a cold engine state and for producing a cold engine signal. In response to the cold engine signal the valve timing device operates to advance the opening timing of the exhaust valve and to reduce the opening duration of the intake valve.

7 Claims, 8 Drawing Sheets

SYSTEM FOR CONTROLLING A VALVE MECHANISM FOR AN INTERNAL COMBUSTION ENGINE

BACKGROUND OF THE INVENTION

The present invention relates to a valve mechanism for an automotive engine and more particularly to a valve mechanism where a valve lift and timing of the valves are varied in accordance with various operating conditions.

In a four-cycle automotive engine, the valve timing and valve lift of the intake and exhaust valve are controlled in accordance with the engine operating conditions, so that an opening angle of the intake and exhaust valves and a valve overlap of both valves are changed.

In such a system, when the valve opening angle or the valve overlap is small, the performance of the engine in a low and middle engine speed range is improved.

On the other hand, it is desirable to quickly activate a catalyst in a catalytic converter and an $O_2$-sensor of an exhaust system by increasing the temperature of exhaust gases in order to improve emission control during the cold engine and idling state. To the contrary, it is preferable to cool the exhaust gases when an automobile is running except when increasing the engine torque in order to improve the durability of the exhaust system and to avoid trouble of the exhaust system caused by heat.

The temperature of the exhaust gas depends largely on the opening timing of the exhaust valve, that is, on the expansion ratio. Therefore, the emission control and the durability of the exhaust system can be improved by controlling the valve timing.

Japanese Patent Application Laid-Open 60-27711 discloses a system for controlling the valve mechanism wherein the opening timing of the exhaust valve is retarded in a middle engine load range so as to increase the expansion ratio, thereby improving fuel consumption. On the other hand, in a heavy engine load range, the valve opening timing of the exhaust valve is advanced to improve the exhaust efficiency, and to increase the power of the engine. Namely, the conventional control system controls the valve timing in the middle and heavy load range. Therefore, the system can not improve the emission in the cold engine. Since the exhaust valve is opened at an earlier timing in the heavy engine load range, the exhaust gas temperature increases, which causes trouble by heat, and reduces the durability of the valve mechanism.

SUMMARY OF THE INVENTION

An object of the present invention is to provide a valve control system wherein the expansion ratio and the exhaust gas temperature are controlled, so that the emission control may be improved during the cold engine and idling state, the exhaust system is prevented from heat trouble, and the power and fuel consumption are improved.

According to the present invention, there is provided a system for controlling a valve mechanism for an internal combustion engine having at least one intake valve, and at least one exhaust valve, the system comprising first detector means for detecting temperature of the engine and for producing a low temperature signal and a high temperature signal dependent on the engine temperature, changing means responsive to the low temperature signal for advancing opening timing of the exhaust valve, and wherein the changing means operates to reduce an opening duration of the intake valve in response to the low temperature signal.

The other objects and features of this invention will become understood from the following description with reference to the accompanying drawings.

DETAILED DESCRIPTION OF THE PREFERRED EMBODIMENTS

Figure 1:
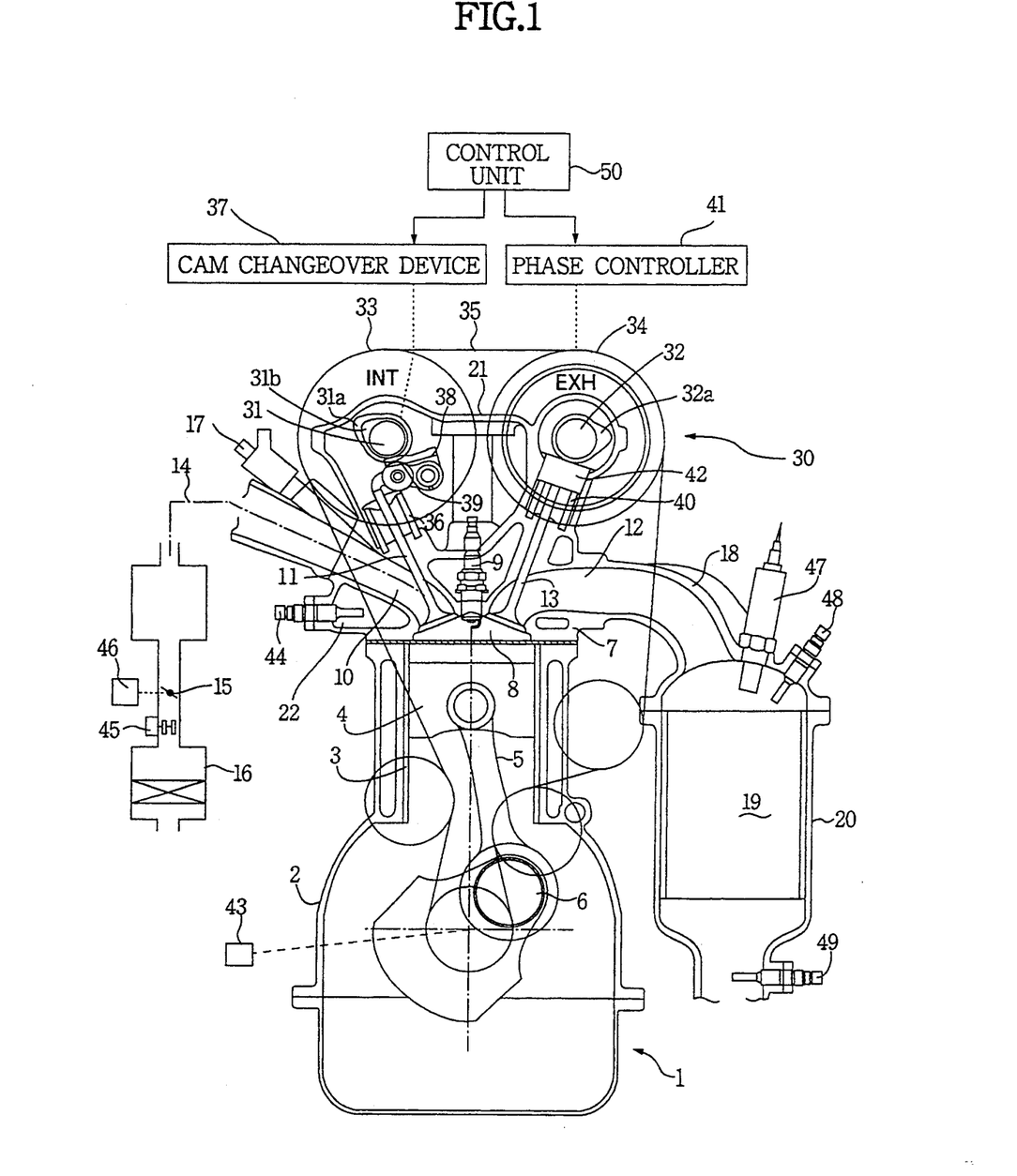
FIG. 1 is a schematic illustration of an internal combustion engine to which the present invention is applied.

Referring to FIG. 1, a double overhead camshaft (DOHC) engine 1 for a motor vehicle comprises a crank case 2, a cylinder 3 formed in the crank case 2, a cylinder head 7 provided on the crank case 2, and a combustion chamber 8 formed in the cylinder head 7 for the cylinder 3. A piston 4 is provided in the cylinder 3 and a connecting rod 5 is connected with the piston 4 and a crankshaft 6. A spark plug 9 is provided on a top of the combustion chamber 8.

The combustion chamber 8 is communicated with an air cleaner 16 through an intake port 10 having an intake valve 11, an intake pipe 14 and a throttle valve 15. A fuel injector 17 is provided in the intake pipe 14 adjacent the intake port 10. The combustion chamber 8 is further communicated with a catalytic converter 20 having a catalyst 19 therein, through an exhaust port 12 having an exhaust valve 13 and an exhaust pipe 18.

A valve mechanism 30 for the intake valve 11 and the exhaust valve 13 is assembled with an overhead intake camshaft 31 and an overhead exhaust camshaft 32 disposed in parallel with each other in a cover 22 mounted on the cylinder head 7. The camshafts 31 and 32 are operatively connected to the crankshaft 6 of the engine 1 through sprockets 33 and 34, and a timing belt 35.

The intake valve 11 has a valve spring 36 between the stem end of the valve and the cylinder head 7 to urge the valve 11 upward to close the intake port 10. On the intake camshaft 31 there is formed a large cam 31a having a large lobe providing a predetermined high lift and a large opening angle for the intake valve 11, and a small cam 31b having a small lobe providing a predetermined low lift and a small opening angle. The large cam 31a and the small cam 31b are selectively engaged with the stem end of the intake valve 11 through a rocker arm 39. The rocker arm 39 has an electrically operated selecting device 38. A cam changeover device 37 is provided so as to control the rocker arm 39.

The exhaust valve 13 has a valve spring 40 disposed between a stem end thereof and the cylinder head 7 to urge the valve 13 upward to close the exhaust port 12. On the camshaft 30 there is formed a cam 32a which abuts on a hydraulic valve lifter 42 for adjusting the valve clearance. The valve lifter engages with the stem end of the valve 13. A phase controller 41 is provided to change the opening timing of the exhaust valve 13 by the angular position of the exhaust cam shaft 32 with respect to the sprocket 34.

The cam changeover device 37 for controlling the operation of the intake valve 11 and the phase controller 41 for controlling the operation of the exhaust valve 13 are operated in accordance with electric signals applied thereto from a control unit 50.

The control unit 50 is applied with signals from various sensors and meters mounted in the engine 1. Namely, the engine 1 is provided with a crank angle sensor 43 mounted on the crankshaft 6, a coolant temperature sensor 44 mounted in a coolant passage 22 of the jacket, an air flow meter 45 mounted in the intake passage 14, and a throttle position sensor 46 on the throttle valve 15. An $O_2$-sensor 47 is mounted in the catalytic converter 20, and exhaust gas temperature sensors 48 and 49 are disposed upstream and downstream of the catalytic converter 20, respectively.

Figure 2:
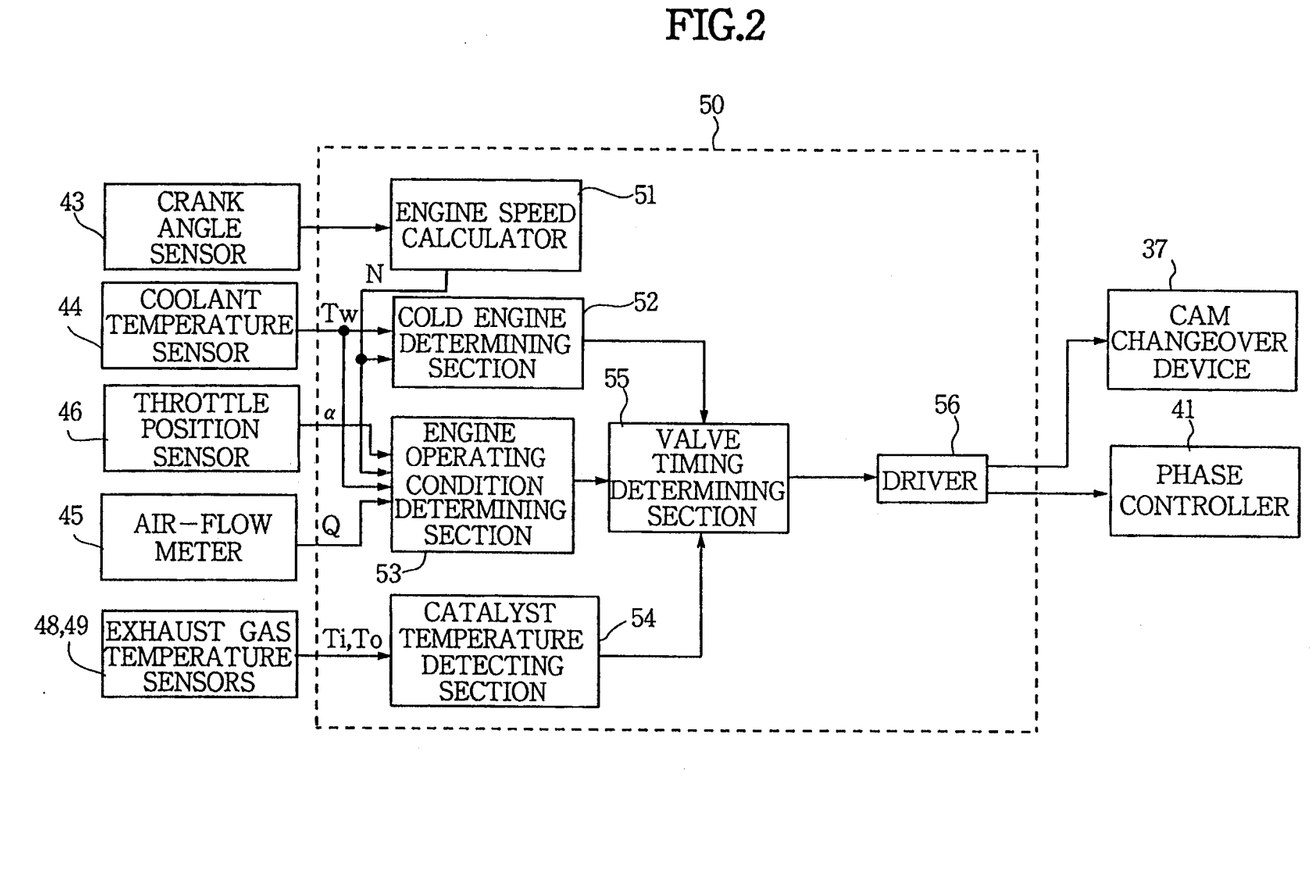
FIG. 2 is a block diagram of a control unit according to the present invention.
Figure 3:
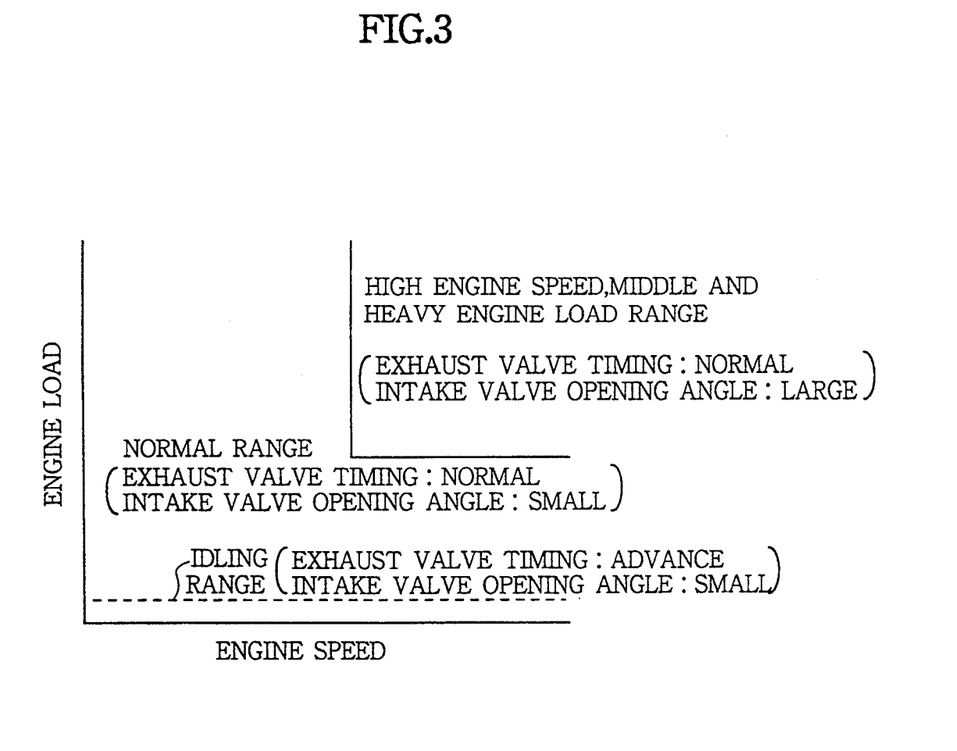
FIG. 3 is a graph showing operational ranges of intake and exhaust valves determined in accordance with engine speed and engine load.

Referring to FIG. 2, the control unit 50 has an engine speed calculator 51 to which the output signal of the crank angle sensor 43 is applied to calculate an engine speed N. The engine speed N and a coolant temperature Tw detected by the coolant temperature sensor 44 are fed to a cold engine determining section 52 where it is determined that the engine is in a cold state when the coolant temperature Tw is lower than a predetermined temperature at the start of the engine. The engine speed N, the coolant temperature Tw, a throttle opening degree $\alpha$ from the throttle position sensor 46 and an intake quantity Q from the air-flow meter 45 are fed to an engine operating condition determining section 53 to determine which of the operation ranges shown in FIG. 3 the engine is in. Namely, when the engine speed N is low and the engine load represented by the throttle opening degree $\alpha$ and the intake quantity Q is small, an idling range is determined. If the engine is in a middle speed range, a normal range is determined. If the engine speed and the engine load further increase, a high engine speed and heavy engine load range is determined.

Exhaust temperatures Ti and To from the exhaust gas temperature sensors 48, 49, provided upstream and downstream of the catalytic converter 20, respectively, are applied to a catalyst temperature detecting section 54 to determine whether the temperature of the catalyst 19 in the catalytic converter 20 reaches a catalyst activating temperature Ts, over which the catalyst effectively works. The catalyst temperature detecting section 54 further detects that the catalyst 19 is overheated.

The output signals of the cold engine determining section 52, the engine operating condition determining section 53, and the catalyst temperature detecting section 54 are fed to a valve timing determining section 55 which determines the operating timing of the exhaust valve 13 and the opening angle of the intake valve 11. Namely, in the idling range or during the cold engine state and the warm-up, it is determined that the opening timing of the exhaust valve 13 is to be advanced and the opening angle of the intake valve 11 is to be small. When the engine is operated under load after the catalyst 19 has reached the activating temperature Ts, in the normal range, the exhaust valve 13 is operated at the normal timing and the intake valve 11 is operated to open with a low lift at a small opening angle. In the high engine speed and middle or heavy engine load range, the exhaust valve 13 is operated at the normal timing and the intake valve 11 is opened with a high lift to provide a large opening angle. If the catalyst temperature detecting section 54 determines that the catalyst 19 is overheated, the exhaust valve 13 is opened at the normal timing and the intake valve 11 is opened with a low lift to provide the small opening angle.

A phase signal for selecting one of the advance and normal timings for the exhaust valve, and a lift signal for selecting one of the high and low lifts of the intake valve are applied to the phase controller 41 and the cam changeover device 37, respectively, through a driver 56.

In operation, the cam shafts 31 and 32 of the valve mechanism 30 are rotated by the crank shaft 6 through the timing belt 35 and the cam sprockets 33 and 34, respectively. The valve timing and the valve lift are controlled by the control unit 50 in accordance with the engine operating conditions and the temperature of the catalyst 19 in the catalytic converter 20.

Figure 4:
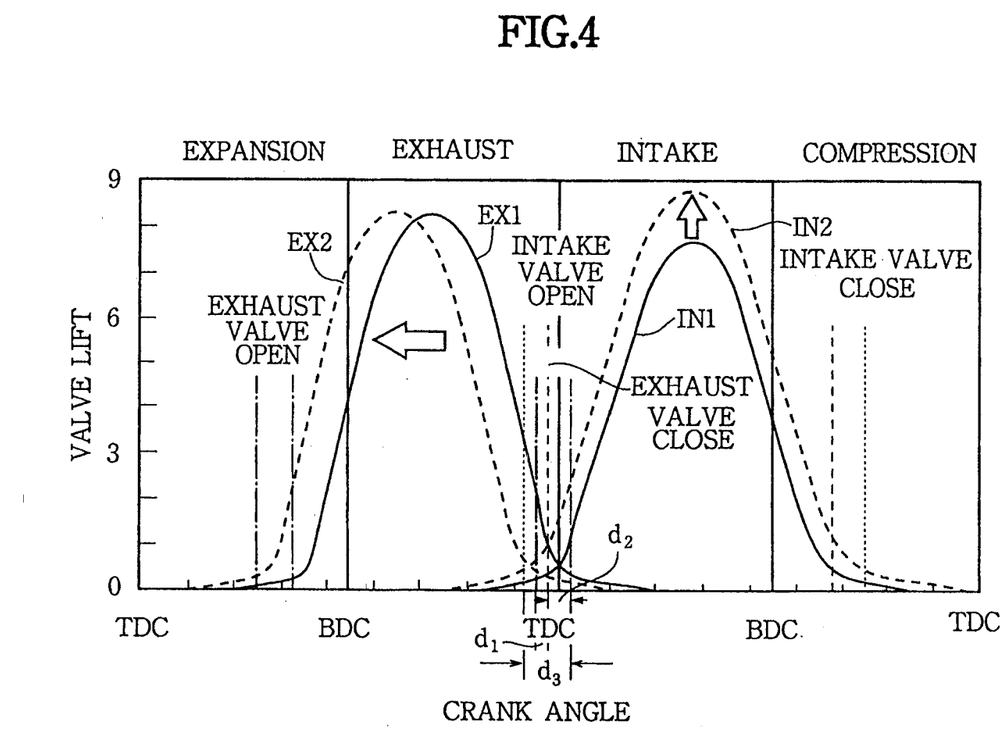
FIG. 4 is a graph showing the characteristics of a valve lift of the intake valve and a valve timing of the exhaust valve in accordance with the present invention.

More particularly, when the engine starts, the cold engine determining section 52 determines the cold engine state. The valve timing determining section 55 therefore determines that the exhaust valve 13 is to be opened at the advance timing and the intake valve 11 is to be opened at the low lift. Hence the valve timing determining section 55 applies a low lift signal to the cam changeover device 37 which operates the selector device 38 to engage the rocker arm 39 with the small cam 31b on the cam shaft 31. The intake valve 11 is thus opened in accordance with a line IN1 in FIG. 4. On the other hand, the phase controller 41 is fed with an advance signal so that the angular position of the shaft 32 carrying the cam 32a is advanced a predetermined angle, thereby advancing the opening timing of the exhaust valve 13 as shown by a line EX2 in FIG. 4. Since the exhaust gas is discharged at an earlier timing in the expansion stroke, expansion ratio of the air-fuel mixture and the workload decrease. However, the temperature of the exhaust gas increases, so that the exhaust gas sufficiently heats the catalyst 19 in the catalytic converter 20, thereby activating the catalyst 19 in a relatively short time after the engine is started. Hence the emission control is improved. The $O_2$-sensor 47 is also heated by the exhaust gas so that the control of the air-fuel ratio based on the output of the $O_2$-sensor is properly performed. Since the valve overlap d1 of the intake and exhaust valves is small, the engine is steadily driven at a low speed.

The valves 11 and 13 are operated in the same manner as the cold engine state during idling in order to warm up the engine. The engine continues to be operated steadily while effectively purifying the exhaust gases. The small valve overlap causes the amount of residual gas to reduce.

When the engine is loaded after the temperature of the catalyst 19 recites the activating temperature Ts, the engine operating condition determining section 53 determines that the engine is in the normal range. The valve timing determining section 55 controls the valve timing in accordance with the graph of FIG. 3. Namely, in the middle engine speed range, the cam changeover device 37 is applied with the low lift signal so that the intake valve 11 is opened at a small opening angle as shown by the line IN1 in FIG. 4, as during idling. On the other hand, the phase controller 41 is fed with a normal phase signal so that the angular position of the shaft 32 returns to the initial position, thereby retarding the opening timing of the exhaust valve 13 as shown by a line EX1 in FIG. 4. Hence the exhaust gases are discharged at a later timing of the expansion stroke. The valve overlap of the valves is increased as indicated by d2 in FIG. 4, so that the expansion ratio and the workload are increased to raise the torque of the engine. Since the temperature of the exhaust gases decreases, the catalyst 19 and other members in the exhaust system are prevented from overheating. Since the exhaust gas temperature is lowered, it is not necessary to reduce the gas temperature with a rich air-fuel mixture. Consequently a lean air-fuel mixture can be used so as to control the emission.

When the engine speed N and the throttle opening degree α are further increased, the engine operating condition determining section 53 determines the high engine speed and heavy engine load range. The valve timing determining section 55 applies a high lift signal to the cam changeover device 37, so that the selector device 38 actuates the rocker arm 39 to engage with the large cam 31a. The intake valve 11 is opened at a large opening angle as shown by a line IN2 in FIG. 4. The phase controller 41 is applied with the normal timing signal as in the low engine speed range. Since the expansion ratio is large, the exhaust gas is maintained at a low temperature. The valve overlap of the valves is further increased as indicated by d3, so that the volumetric efficiency in the high engine speed range is increased thereby to provide a large power.

When the catalyst temperature detecting section 54 determines that the catalyst 19 had become extremely hot depending on the output of the exhaust gas temperature sensors 48 and 49, the intake valve 11 is operated to open at the small opening angle and the exhaust valve 13 at the retarded normal timing as in the normal range. Thus the exhaust gas is cooled, thereby restraining the reaction of the catalyst and the temperature thereof. As a result, the breakdown of the catalytic converter 20 is prevented.

Figure 5:
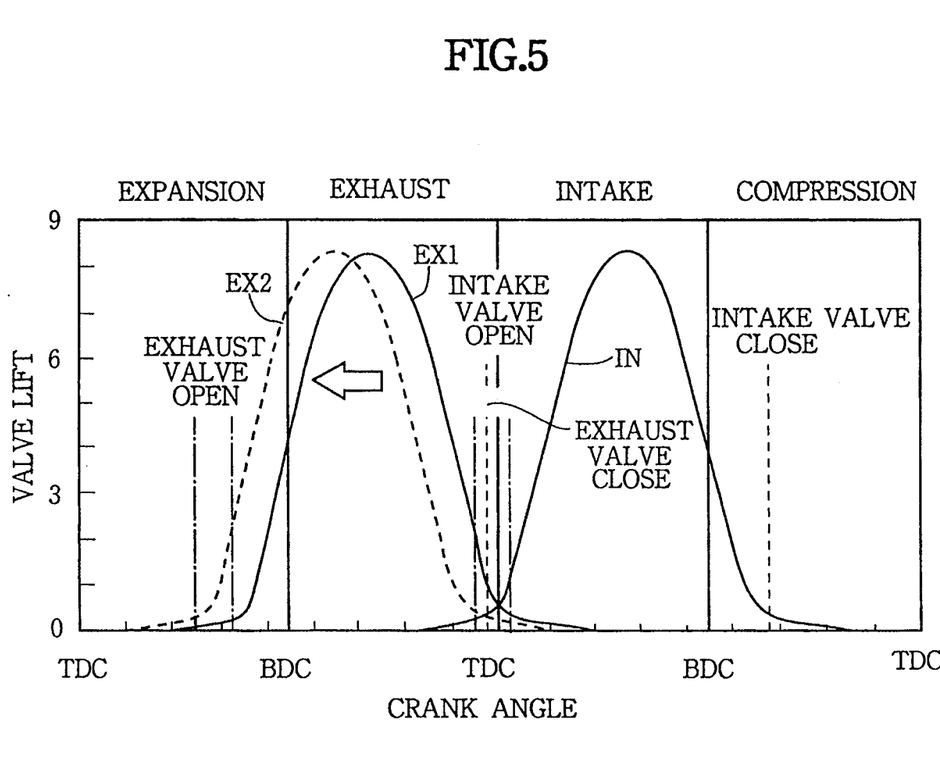
FIG. 5 is a graph showing the characteristics of the intake and exhaust valves in a modification of the first embodiment.

The operations of the intake and exhaust valves are summarized in the following table.

ing is retarded. FIG. 5 shows the operation of the intake and exhaust valves.

In the modification, the valve mechanism for the intake valve 11 is the same as that of the exhaust valve 13. The valve mechanism comprises a hydraulic lifter instead of the rocker arm 39. The remaining construction and operations are the same as the first embodiment.

Figure 6:
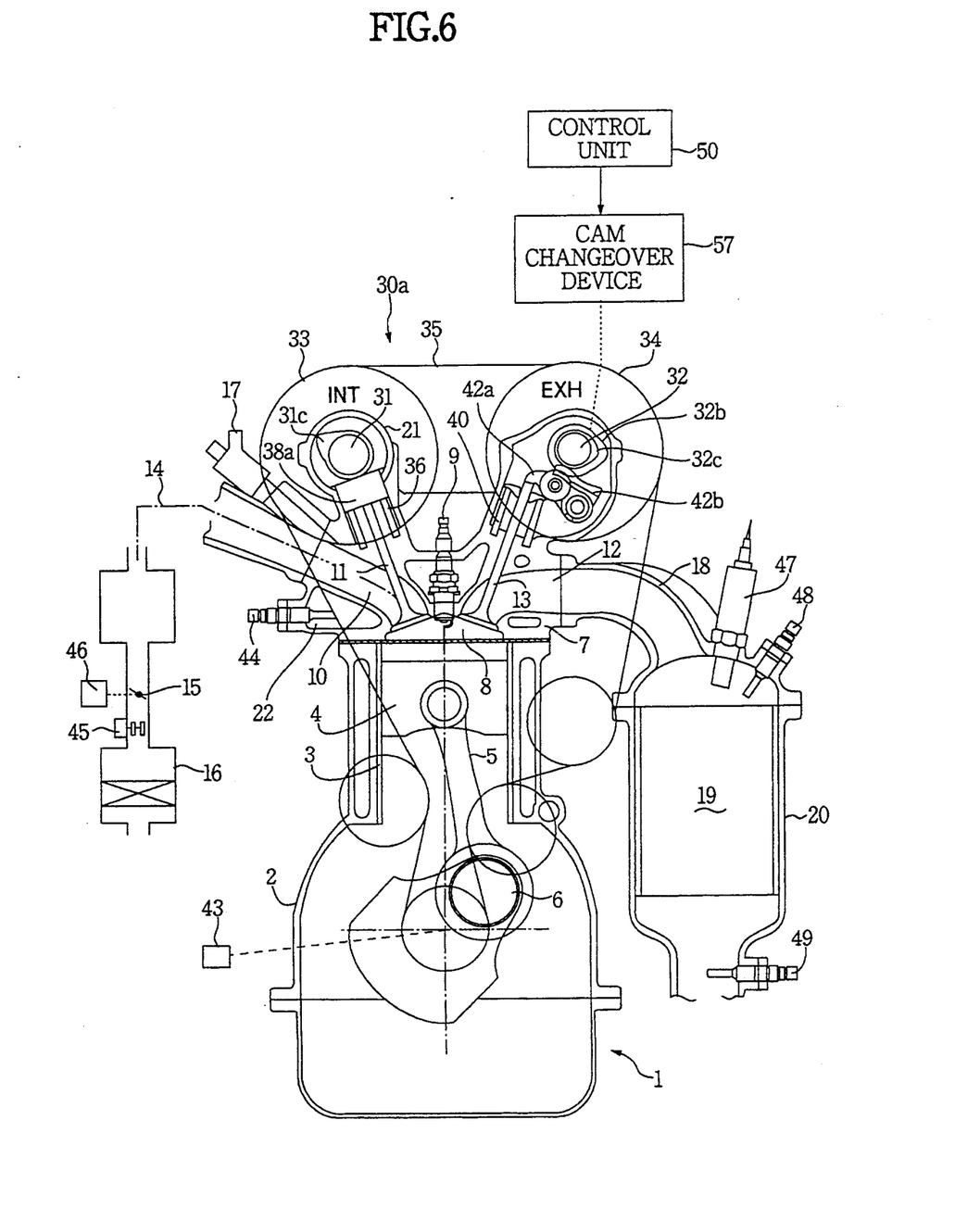
FIG. 6 is a schematic diagram of a valve mechanism in a second embodiment of the present invention.

The second embodiment of the present invention is adapted to control the valve lift and the opening timing of the exhaust valve. FIG. 6 shows a valve mechanism 30a of the intake valve 11 and the exhaust valve 13 which are incorporated with the engine 1 described in the first embodiment.

The camshaft 31 has a cam 31c which is adapted to bear on a hydraulic lifter 38a which is engaged with the stem end of the valve 11. The spring 36 is disposed between the hydraulic lifter 38a and the cylinder head 7, thereby urging the valve 11 upward.

On the exhaust camshaft 32 there are formed a large cam 32b having a large lobe and a small cam 32c having a small lobe. The large cam 32b is adapted to open the exhaust valve 13 at an advanced timing and at a predetermined high lift. The small cam 32c is adapted to open the exhaust valve 13 at a retarded timing and at a low lift. The large cam 32b and the small cam 32c are selectively engaged with the stem end of the exhaust valve 13 through a rocker arm 42a. The rocker arm 42a has an electrically operated selecting device 42b which is operatively connected to a cam changeover device 57 so as to control the rocker arm 42a. The cams 32b and 32c are adapted to close the exhaust valve at the same timing. Hence the overlap period of the intake valve and the exhaust valve does not vary.

Figure 7:
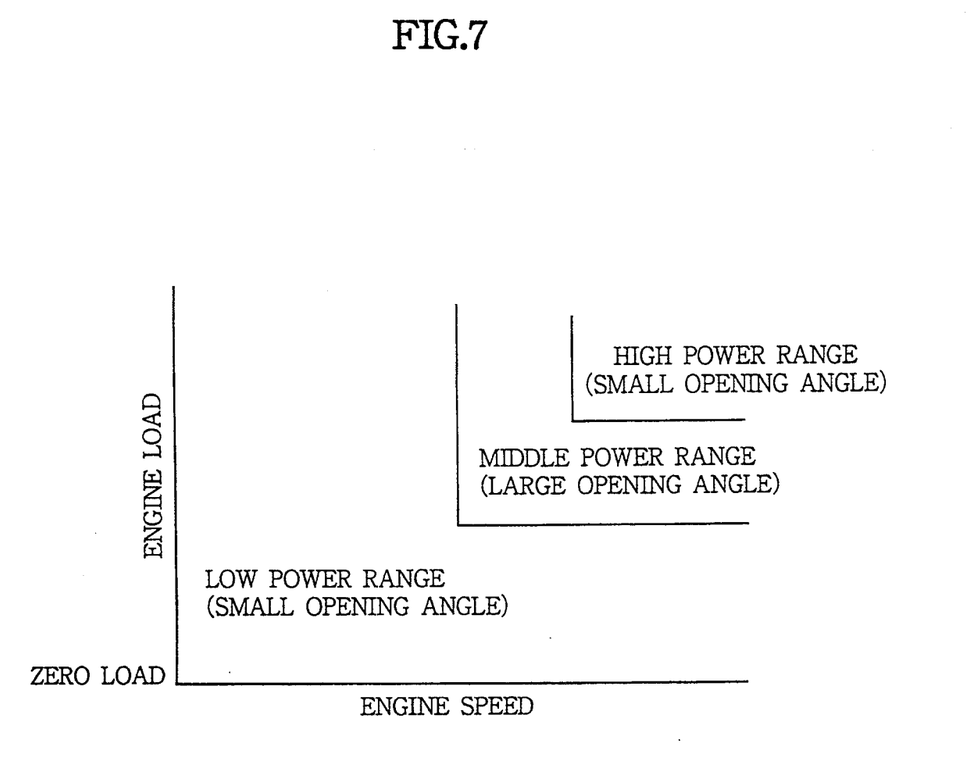
FIG. 7 is a graph showing the operational ranges of the intake and exhaust valves of the second embodiment.

The control unit 50 which electronically controls the cam changeover device 57 has the same construction as in the first embodiment. The engine operating condition determining section 53 determines a low power range, middle power range or a high power range, as shown in the graph of FIG. 7, in accordance with the engine speed N, the throttle opening degree α, and the intake quantity Q. The valve timing determining section 56 determines the valve lift of the exhaust valve 13 in accordance with the engine operating conditions and whether the catalyst 19 in the catalytic converter 20 reaches the activating temperature Ts. A low lift signal or a high lift signal depending on the decision of the valve timing determining section 56 is applied to the

TABLE 1

| | EXHAUST VALVE | INTAKE VALVE | EXPANSION RATIO | EXHAUST GAS TEMPERATURE | VALVE OVERLAP |
|---|---|---|---|---|---|
| COLD ENGINE, IDLING | ADVANCE TIMING | SMALL ANGLE | SMALL | HIGH | SMALL (d1) |
| NORMAL RANGE | NORMAL TIMING | SMALL ANGLE | LARGE | LOW | MIDDLE (d2) |
| HIGH ENGINE SPEED, MIDDLE HEAVY LOAD RANGE | NORMAL TIMING | LARGE ANGLE | LARGE | LOW | LARGE (d3) |
| ABNORMALLY HIGH CATALYST TEMPERATURE | NORMAL TIMING | SMALL ANGLE | LARGE | LOW | MIDDLE (d2) |

The present invention may be modified so as to control only the exhaust valve in accordance with the engine operating conditions. That is to say, during the warm up or idling, the opening timing of the exhaust valve is advanced, and during the steady state, the timcam changeover device 57 through the driver 56.

Figure 8:
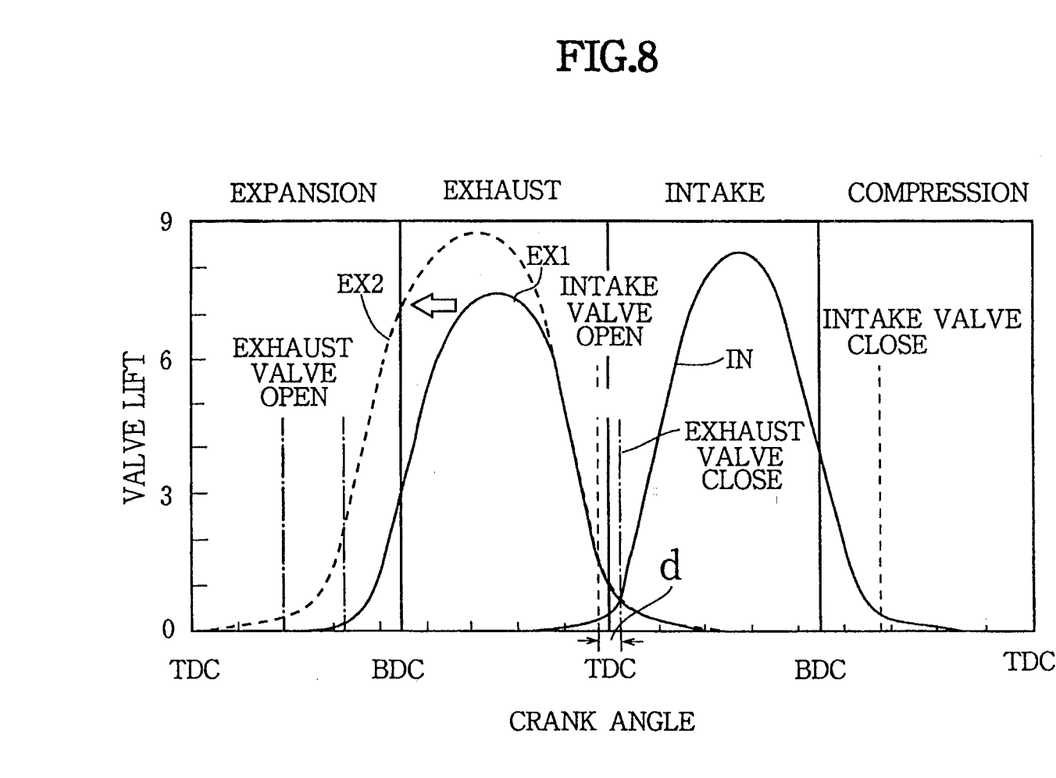
FIG. 8 is a graph showing the characteristics of the intake and exhaust valves in accordance with the second embodiment.

The operation is described hereinafter with reference to FIG. 8. At the start of the engine, that is during the cold engine state, the valve timing determining section 55 determines that the exhaust valve 13 is to be opened at the advanced timing with a high lift. Hence the valve timing determining section 55 applies the high lift signal to the cam changeover device 57 which operates the selector device 42b to engage the rocker arm 42a with the large cam 32b on the cam shaft 32. The exhaust valve 13 is thus opened in accordance with a line EX2 in FIG. 8. Since the exhaust gas starts to be discharged at an earlier timing of the expansion stroke, although expansion ratio of the air-fuel mixture and the workload are decreased, the temperature of the exhaust gas increases. Consequently, the exhaust gas sufficiently heats the catalyst 19 in the catalytic converter 20, thereby activating the catalyst 19 in a relatively short time after the engine is started. Hence the emission control is improved. The $O_2$-sensor 47 is also heated by the exhaust gas so that the control of the air-fuel ratio based on the output of the $O_2$-sensor is properly performed. Since the valve overlap d of the intake and exhaust valves is small, the engine is steadily driven at a low speed.

The valves are operated in the same manner as the cold engine state during idling in order to warm up the engine. The engine continues to be operated steadily while effectively purifying the exhaust gases.

When the catalyst 19 reaches the activating temperature Ts, the valve timing determining section 55 controls the valve timing in accordance with the graph of FIG. 7. Namely, in the low power range, the cam changeover device 57 is applied with the low lift signal so that the exhaust valve 13 is operated at a retarded timing at the small opening angle as shown by the line EX1 in FIG. 8. Hence the exhaust gases are discharged at a latter timing of expansion stroke, so that the expansion ratio and the workload are increased to raise the torque of the engine. Since the temperature of the exhaust gases decreases, the catalyst 19 and other members in the exhaust system are prevented from overheating. The exhaust system is thus protected from heat, particularly when the automobile is in a traffic jam.

When the engine operating condition determining section 53 determines the middle power range, the high lift signal is applied to the cam changeover device 57. The selector device 42b operates the rocker arm 42a to engage with the large cam 32b. The exhaust valve 13 is hence opened at a large opening angle at the advanced timing so that the exhaust efficiency is increased. The opening angle of the intake valve is not increased.

In the high power range, the cam changeover device 57 is applied with the low lift signal. Thus, the opening timing of the exhaust valve 13 is retarded and the opening angle is decreased, thereby cooling the exhaust gas. Since the exhaust gas temperature is lowered, it is not necessary to reduce the gas temperature with a rich air-fuel mixture. Consequently, a lean air-fuel mixture can be used so as to control the emission.

When the temperature of the catalyst 19 abnormally rises during the cold engine or idling state wherein the exhaust valve 13 is opened at a large opening angle, the cam changeover device 57 is immediately operated to select the small cam 32c. Thus the exhaust gas is cooled, thereby restraining the reaction of the catalyst and the temperature thereof. As a result, a breakdown of the catalytic converter 20 is prevented.

The operations of the exhaust valve are summarized in the following table.

TABLE 2

| | | EXHAUST VALVE | EXPANSION RATIO | EXHAUST GAS TEMPERATURE | EXHAUST EFFICIENCY |
|---|---|---|---|---|---|
| COLD ENGINE, UNDER ACTIVATING TEMPERATURE | | LARGE ANGLE | SMALL | HIGH | SMALL |
| OVER ACTIVATING TEMPERATURE | LOW POWER RANGE | SMALL ANGLE | LARGE | LOW | MIDDLE |
| | MIDDLE POWER RANGE | LARGE ANGLE | SMALL | HIGH | LARGE |
| | HIGH POWER RANGE | SMALL ANGLE | LARGE | LOW | MIDDLE |
| ABNORMALLY HIGH CATALYST TEMPERATURE | | SMALL ANGLE | LARGE | LOW | |

The present invention may be applied to other valve mechanisms provided with other means for changing the angular disposition of the camshaft and for selecting the cam.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling a valve mechanism for an internal combustion engine having at least one intake valve, and at least one exhaust valve, the system comprising;

first detector means for detecting a temperature of the engine and for producing a low temperature signal and a high temperature signal dependent on the engine temperature;

changing means responsive to said low temperature signal for advancing an opening timing of said exhaust valve; and said changing means operates to reduce an opening duration of said intake valve in response to said low temperature signal.

2. The system according to claim 1, further comprising:

load detector means for detecting a load on the engine heavier than a predetermined value and for producing a heavy load signal, and said changing means being responsive to the heavy load signal for increasing the opening duration of said intake valve.

3. The system according to claim 1, further comprising:

second temperature detector means for detecting a temperature of a catalyst and for producing a high catalyst temperature signal, and said changing means being responsive to the high catalyst temperature signal for reducing the opening duration of said intake valve.

4. A valve timing control system of an engine having an intake valve mounted on a cylinder head for controlling an amount of intake air into a cylinder, an exhaust valve mounted on said cylinder head for controlling an amount of exhaust gas from said cylinder, an intake cam driven by an intake camshaft for urging said intake valve, an exhaust valve cam connected to an exhaust cam shaft for pushing said exhaust valve, variable means interposed between said valves and said cams for changing an open and close timing thereof, a throttle valve interposed between an injector and said cylinder for controlling power of said engine, an engine speed sensor for detecting an engine speed and for producing an engine speed signal, a coolant temperature sensor for detecting a temperature of said engine and for producing a temperature signal, a throttle position sensor for detecting an opening degree of said throttle valve and for producing a throttle signal, an air flow meter inserted in an intake passage for detecting an air flow induced into said cylinder and for producing an air flow signal, and an exhaust gas temperature sensor provided in a catalyst for detecting an exhaust gas temperature and for producing an exhaust gas temperature signal, the improvement of the system which comprises:

judging means responsive to said speed signal and said temperature signal for determining whether said engine is in a cold state and for generating a state signal when an engine temperature of said engine is lower than a predetermined value;

engine operating condition determining means responsive to said speed, said temperature, said throttle and said air flow signals for deciding an engine operating condition and for generating an engine operating condition signal;

catalyst condition detecting means responsive to said exhaust gas temperature signal for sensing a catalyst condition and for producing a catalyst condition signal;

valve timing determining means responsive to said speed signal, said engine operating signal and said catalyst condition signal for computing said open and close timing in dependency on said engine operating condition and for producing an exhaust valve open timing signal and an intake valve opening period signal so as to make an opening timing of said exhaust valve advanced and to make an opening duration of said intake valve short when said engine is in said cold state, to make said opening timing of said exhaust valve normal and to make said opening duration of said intake valve short when said engine is at an abnormally high temperature and to make said opening timing of said exhaust valve normal and to make said opening duration of said intake valve long when said engine is operated in high load; and     a driver responsive to said exhaust valve open timing signal and an intake valve opening period signal for controlling said variable means in order to operate said engine in an optimum condition at any temperature.

5. The system according to claim 4, further comprising:

cam changeover means connected to said driver for controlling a phase of said exhaust valve open timing and for selecting a wide open cam and a short open cam of said intake valve.

6. A valve timing control system of an engine having an intake valve mounted on a cylinder head for controlling an amount of intake air into a cylinder, an exhaust valve mounted on said cylinder head for controlling an amount of exhaust gas from said cylinder, an intake cam driven by an intake camshaft for urging said intake valve, an exhaust valve cam connected to an exhaust cam shaft for pushing said exhaust valve, variable means interposed between said valves and said cams for changing an open and close timing thereof, a throttle valve interposed between an injector and said cylinder for controlling power of said engine, an engine speed sensor for detecting an engine speed and for producing an engine speed signal, a coolant temperature sensor for detecting a temperature of said engine and for producing a temperature signal, a throttle position sensor for detecting an opening degree of said throttle valve and for producing a throttle signal, an air flow meter inserted in an intake passage for detecting an air flow induced into said cylinder and for producing an air flow signal, and an exhaust gas temperature sensor provided in a catalyst for detecting an exhaust gas temperature and for producing an exhaust gas temperature signal, the improvement of the system which comprises:

judging means responsive to said speed signal and said temperature signal for determining whether said engine is in a cold state and for generating a state signal when an engine temperature of said engine is lower than a predetermined value;

engine operating condition determining means responsive to said speed, said temperature, said throttle and said air flow signals for deciding an engine operating condition and for generating an engine operating condition signal;

catalyst condition detecting means responsive to said exhaust gas temperature signal for sensing a catalyst condition and for producing a catalyst condition signal;

valve timing determining means responsive to said speed signal, said engine operating signal and said catalyst condition signal for computing said open and close timing in dependency on said engine operating condition and for producing an exhaust valve open timing signal and an intake valve opening period signal so as to change an exhaust valve advanced opening degree and phase when said engine is in the cold state and to decide an exhaust valve retarded opening phase when said catalyst is at an abnormally high temperature by a heavy load operating condition of said engine after the temperature of said catalyst reaches an activation temperature; and     a driver responsive to said exhaust valve open timing signal for controlling said variable means in order to operate said engine in an optimum condition at any temperature.

7. A valve timing control system of an engine having an intake valve mounted on a cylinder head for controlling an amount of intake air into a cylinder, an exhaust valve mounted on said cylinder head for controlling an amount of exhaust gas from said cylinder, an intake cam driven by an intake camshaft for urging said intake valve, an exhaust valve cam connected to an exhaust cam shaft for pushing said exhaust valve, variable means interposed between said valves and said cams for changing an open and close timing thereof, a throttle valve interposed between an injector and said cylinder for controlling power of said engine, an engine speed sensor for detecting an engine speed and for producing an engine speed signal, a coolant temperature sensor for detecting a temperature of said engine and for producing a temperature signal, a throttle position sensor for detecting an opening degree of said throttle valve and for producing a throttle signal, an air flow meter inserted in an intake passage for detecting an air flow induced into said cylinder and for producing an air flow signal, and an exhaust gas temperature sensor provided in a catalyst for detecting an exhaust gas temperature and for producing an exhaust gas temperature signal, the improvement of the system which comprises:

judging means responsive to said speed signal and said temperature signal for determining whether said engine is in a cold state and for generating a state signal when an engine temperature of said engine is lower than a predetermined value;

engine operating condition determining means responsive to said speed, said temperature, said throttle and said air flow signals for deciding an engine operating condition and for generating an engine operating condition signal;

catalyst condition detecting means responsive to said exhaust gas temperature signal for sensing a catalyst condition and for producing a catalyst condition signal;

valve timing determining means responsive to said speed signal, said engine operating signal and said catalyst condition signal for computing said open and close timing in dependency on said engine operating condition and for producing an exhaust valve open timing signal and an intake valve opening period signal so as to decide an exhaust valve wide opening period when said engine is operated in the cold state until the temperature of said catalyst reaches an activation temperature and to decide an exhaust valve short opening period when said catalyst is at an abnormally high temperature by a heavy load operating condition of said engine after the temperature of said catalyst reaches the activation temperature; and a driver responsive to said exhaust valve open timing signal for controlling said variable means in order to operate said engine in an optimum condition at any temperature.

* * * * *